UNITED STATES PATENT OFFICE.

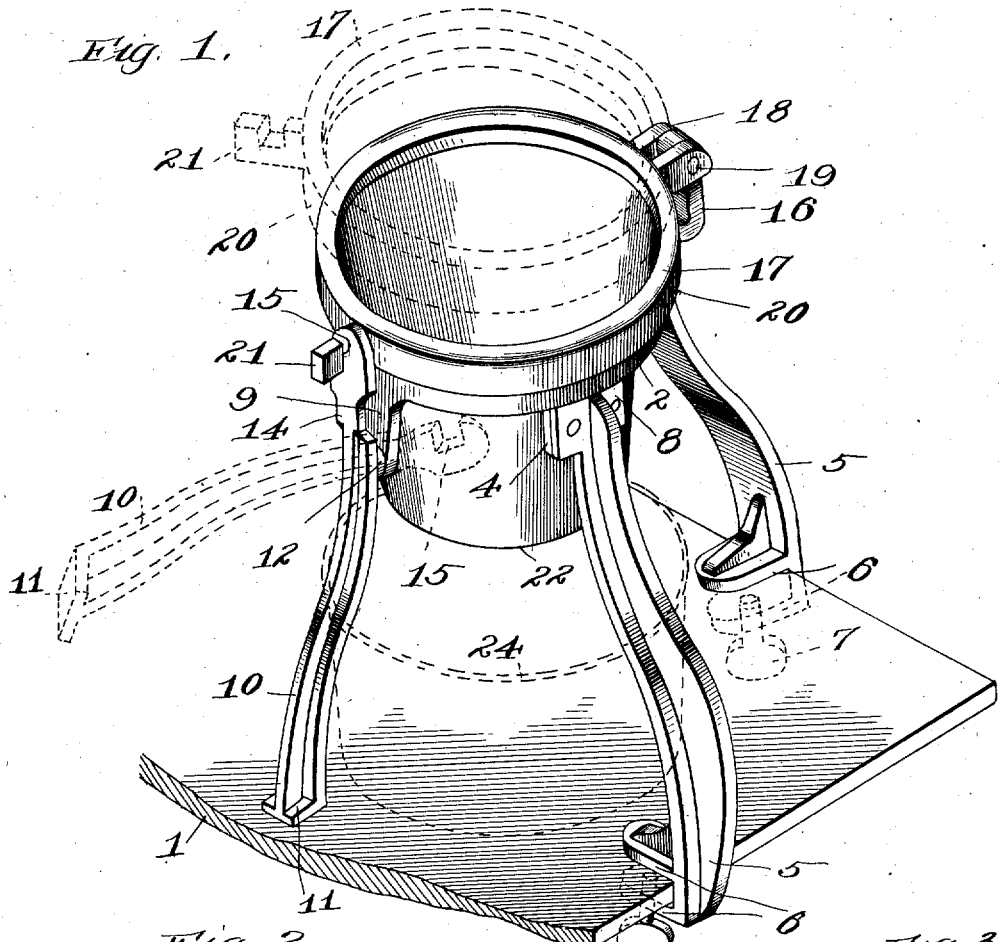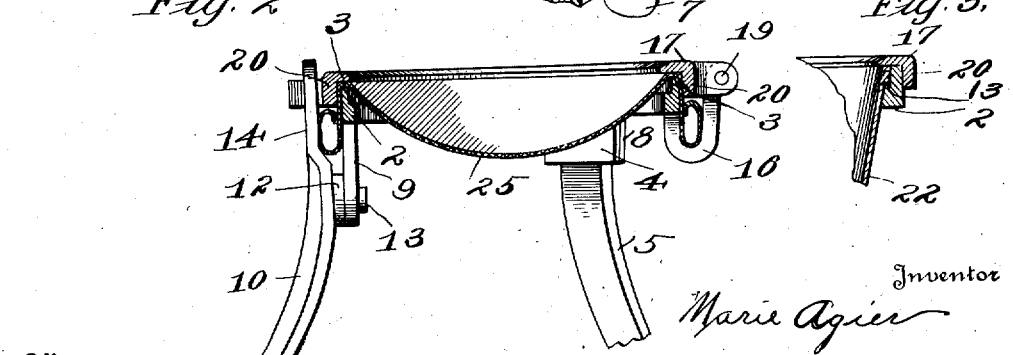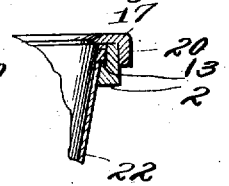

MARIE AGIER, OF WASHINGTON, DISTRICT OF COLUMBIA, ASSIGNOR OF ONE-HALF TO WILLIAM WATTS, OF WASHINGTON, DISTRICT OF COLUMBIA.

CULINARY STAND.

1,099,154.  Specification of Letters Patent.  Patented June 9, 1914.

Application filed January 24, 1914. Serial No. 814,181.

*To all whom it may concern:*

Be it known that I, MARIE AGIER, a citizen of France, residing at Washington, in the District of Columbia, have invented certain new and useful Improvements in Culinary Stands, of which the following is a specification.

In beating up batter and forcing meats and vegetables etc. through a perforated utensil it is necessary to hold the utensil with one hand in order to keep it from moving and upsetting; and in straining jellies and dressings it is difficult to conveniently suspend the strainer cloth, it being the practice of many chefs, who have large quantities of materials to handle to invert a chair, place a large vessel between the chair legs and suspend a strainer cloth from the four legs of the chair over the vessel. Many other expedients are resorted to all more or less inconvenient.

The object of my invention is to provide a culinary utensil made in various sizes, adapted for home and hotel use, of such construction to enable me to manufacture and sell it at a comparatively low price.

A further object of my invention is to provide a culinary utensil which may be used for beating up batter, and other compounds, and vegetables and for holding a strainer, the construction being such that it may be secured, fastened in place, one of the legs of the utensil being movable to enable a suitable vessel being placed under the utensil; and with these and other objects in view my invention consists of the parts and combination of parts as will be hereinafter more fully pointed out.

In the drawings: Figure 1 is a perspective view of my culinary utensil secured to a support; Fig. 2 is a vertical central section of Fig. 1, parts being broken away; a straining cloth being substituted for the receptacle shown in Fig. 1; Fig. 3 is an enlarged detail view.

The reference numeral 1 designates a suitable support, such as a table top, being shown broken away.

The supporting ring 2 of my improved utensil is provided with an annular shoulder 3 formed about midway the height of the ring. This supporting ring is provided with two depending lugs 4 to each of which is secured a leg 5 which legs terminate at their lower ends in clamping jaws 6, there being a clamping screw 7, preferably, in the lowermost jaw whereby the utensil is firmly secured to the table or other support. The upper ends of the legs have laterally extending ears 8. 9 are rivets, or other suitable securing devices for securing said legs to the lugs 4 of the supporting ring 2.

9 is an arm depending from the supporting ring 2 on which a leg 10 is pivotally mounted to swing as shown in dotted lines in Fig. 1. This leg 9 is shorter than the other legs and is provided with a foot 11 adapted to rest upon the top of the support 1. The leg 10 is provided with a spacing boss 12 and a pivot pin 13, extending therefrom, which pin passes through an opening in the lower portion of the arm 9. The leg 10 is provided at its upper end with a keeper arm 14 which is offset, as shown in Fig. 2 from the arm 9 of the supporting ring 2 to provide a space therebetween. 15 is a lock recess formed in the upper end portion of the arm 14.

16 is a substantially U shaped hinge member preferably cast integral with the supporting ring 2, a portion of which depends below the said ring.

The clamping ring 17 is provided at one side with hinge members 18 which are secured to the hinge member 16 by means of the pintle 19. This ring has a depending annular flange 20 which is adapted to fit closely around the outer wall of the supporting flange as shown in Fig. 2, while the ring 17 overhangs the supporting ring with its inner wall approximately flush with the inner wall of the supporting ring, and serves to lock pans etc. within the supporting ring on the shoulder 3.

The supporting ring 17 is provided with a locking arm 21 which is constructed and positioned to be engaged by the locking recess on the arm 14 of the leg 10 as shown.

The receptacle 22 is adapted to hold different compounds and articles to be treated. 25 is a straining cloth.

The device being secured to a support as shown in Fig. 1, the leg 10 is swung on its pivot as shown in dotted lines thereby disengaging the keeper arm 14 from the locking arm 21 whereupon the ring 17 is free to be swung up on its hinge away from the ring 2, so that a suitable receptacle, such as 22, may be inserted in the ring 2, the flange 13 of the receptacle resting on the shoulder 3, as shown on Fig. 3. The ring 17 is then moved to its lowered position on the supporting ring, and overlies the flange of the receptacle thereby holding it firmly on the shoulder 3. The leg 10 is now moved to the full line position, Fig. 1, thereby locking the arm 21 in the locking recess 15 of the keeper arm 14. The contents of the receptacle may now be operated upon without danger of the support slipping or overturning. Both hands are free to manipulate the contents of the receptacle. In case it is necessary or desirable to place a container 24 under the receptacle, it is placed in position between the legs while the leg 10 is in its dotted line position.

In using the utensil to support a strainer cloth 25, the ring 17 is swung to open position and the cloth is stretched over the supporting ring 2 with the surplus marginal material tucked in the space between the members of the U shaped hinge member, and in the space between the ring 2, arm 9 and the offset arm 14 whereupon the ring 17 is moved to closed position and locked by swinging the leg 10 to its full line position Fig. 1. The ring 17 presses the cloth 25 on top of the supporting ring 2 while the flange 20 firmly binds the cloth against the side of the ring 2.

Of course any suitable receptacle 22 may be used.

What I claim is:

1. A culinary stand comprising a supporting ring, legs supporting said ring one of which is pivotally mounted, a clamping ring hinged to said supporting ring and means carried by the clamping ring adapted to be engaged by said pivotally mounted leg and locked thereby on the supporting ring.

2. In a culinary stand, a supporting ring, legs rigidly secured to said ring, a leg pivotally mounted on said ring and provided with a locking recess in its upper end portion, a clamping ring hinged to the supporting ring, an arm extending from the clamping ring and adapted to engage said locking recess to clamp the clamping ring on the supporting ring.

3. In a culinary stand, a supporting ring, a clamping ring hinged to and overlying the supporting ring, an annular flange depending from said clamping ring and lying in close proximity to the outer face of the supporting ring, legs rigidly secured to the supporting ring, and a leg pivotally connected with the supporting ring.

4. In a culinary stand, a supporting ring, having an annular shoulder formed on its inner wall, a clamping ring hinged to and overlying the supporting ring and its annular shoulder, an annular flange depending from the clamping ring and lying in close proximity to the outer face of supporting ring, when in closed position, legs rigidly secured to the supporting ring, and a leg pivotally connected with the supporting ring.

5. In a culinary stand, a supporting ring, a substantially U shaped hinge member secured to and extending below said ring, an arm depending from said ring, a leg pivotally mounted on said arm and terminating at its upper end in an offset arm having a locking recess, legs rigidly secured to said ring, and a clamping ring hinged to said U shaped hinge member of the supporting ring, and a keeper extending from said clamping ring constructed to be engaged by the said locking recess to secure the clamping ring on the supporting ring.

6. In a culinary stand, a supporting ring, a clamping ring hinged to and overlying the supporting ring, an annular flange depending from said clamping ring and lying in close proximity to the outer face of the supporting ring, legs rigidly secured to said supporting ring, clamps on the lower ends of said legs, and a leg pivotally connected with the supporting ring.

7. In a culinary stand, a supporting ring having an annular shoulder on its inner face, a substantially U shaped hinge member secured to and depending from said ring, lugs depending from said ring, legs secured to said lugs, clamps on the lower ends of said legs, an arm depending from said ring, a leg pivotally mounted on said arm, an offset arm extending upwardly from the pivoted leg and provided with a locking recess, a clamping ring hinged to said U shaped hinged member and overlying said supporting ring and its annular shoulder, an annular flange depending from the clamping ring and lying in close proximity to the outer face of the supporting ring when in closed position, and a keeper arm extending from said ring and adapted to engage the locking recess of the offset arm to lock the clamping ring on the supporting ring.

In testimony whereof I affix my signature in presence of two witnesses.

MARIE AGIER

Witnesses:
WILLIAM WATTS,
EDWIN S. CLARKSON.